(12) United States Patent
Barguirdjian

(10) Patent No.: US 6,346,791 B1
(45) Date of Patent: Feb. 12, 2002

(54) SELF-CONTAINED RECHARGING DEVICE FOR PORTABLE TELEPHONE AND/OR BATTERY AND/OR PROTECTIVE CASE

(75) Inventor: Pascal Barguirdjian, Saint-Melo (FR)

(73) Assignee: Sarl Tecknisolar-Seni, Saint-Malo Cedex (FR)

( * ) Notice: Subject to any disclaimer, the term of this patent is extended or adjusted under 35 U.S.C. 154(b) by 0 days.

(21) Appl. No.: 09/509,671

(22) PCT Filed: Jul. 29, 1999

(86) PCT No.: PCT/FR99/01870

§ 371 Date: Jun. 16, 2000

§ 102(e) Date: Jun. 16, 2000

(87) PCT Pub. No.: WO00/07277

PCT Pub. Date: Feb. 10, 2000

(30) Foreign Application Priority Data

Jul. 30, 1998 (FR) .............................. 98 09957

(51) Int. Cl.⁷ .................................. H02J 7/00
(52) U.S. Cl. ........................ 320/101; 320/107
(58) Field of Search ................. 320/101, 107, 320/138, 139

(56) References Cited

U.S. PATENT DOCUMENTS

| 4,054,826 | A | | 10/1977 | Wahlstrom | ................... 310/308 |
| 5,363,445 | A | | 11/1994 | Shyu | ......................... 379/433 |
| 5,579,388 | A | | 11/1996 | Endroes et al. | ............. 379/433 |
| 5,644,207 | A | | 7/1997 | Ark et al. | .................... 320/101 |
| 6,127,797 | A | * | 10/2000 | Walker | ....................... 320/101 |
| 6,131,047 | A | * | 10/2000 | Hayes, Jr. et al. | .......... 455/566 |

FOREIGN PATENT DOCUMENTS

| JP | 10 146213 | 6/1998 |
| WO | 97 39491 | 10/1997 |
| WO | 98 05900 | 2/1998 |

* cited by examiner

Primary Examiner—Peter S. Wong
Assistant Examiner—Lawrence Luk
(74) Attorney, Agent, or Firm—Lowe Hauptman Gilman & Berner, LLP

(57) ABSTRACT

The invention concerns a recharging device (4), comprising and consisting of photovoltaic sensors (5), alveolar lens particles (11), light energy amplifier (6), electronic management unit (7), magnetic counter-weight (17), steel balls (18), spring mechanism (22) with its manual butterfly winder (23), alternator (25) and battery (2), consisting in a single extra flat system, comprising several forms of recharging and in all conditions and all positions, inserted and fixed, matching the shape of the mobile (cellular) portable telephone (1), or on the protective case (21), or on a battery (2) or any other communication means comprising a transmitter-receiver, providing them with autonomy, causing them to operate by delivering voltage and electric current (13) so as to recharge them, maintain them and enabling them to operate, using daylight (10), artificial lighting (8), vibrations (20), movements (19) and the spring manual winder.

9 Claims, 2 Drawing Sheets

SELF-CONTAINED RECHARGING DEVICE FOR PORTABLE TELEPHONE AND/OR BATTERY AND/OR PROTECTIVE CASE

FIELD OF THE INVENTION

This invention includes a device whose purpose is to recharge the batteries of a mobile (cellular) portable telephone through the use of a photovoltaic and vibratory device equipped with a management unit and an artificial and natural light energy amplifier and an inertia magnetic counter-weight ball which is sensitive to motion in order to create self-contained power.

BACKGROUND ART

In fact, presently, all the mobile (cellular) portable telephones are equipped with Nickel hybrid metal batteries or Lithium ion batteries or Cadmium Nickel batteries rechargeable only on the 220-volt power network or through the cigarette lighter in vehicles, which, after recharging, provide a few dozen hours of self-contained power.

The device used currently presents several drawbacks:

First, when the mobile (cellular) portable telephone charge is used up, and the batteries' charge is low, communication through the telephone's transmission-reception is cut. And to recharge it, it is necessary to plug it into the 220-volt power network for several hours, on the condition that an electrical outlet can be found nearby or that one has access to a vehicle's cigarette lighter or some other means, etc.

Second, if the mobile (cellular) portable telephone user is at sea, in the countryside or in the mountains, or in a tent in a campground at night and does not have a source of electricity to recharge the telephone, he will not be able to use the mobile (cellular) portable telephone if the batteries' charge is low. In fact, the transmitter-receiver of the portable telephone needs, during use, continuous direct current voltage delivered by its battery.

Third, the mobile (cellular) portable telephone, after being recharged on the 220-volt power network or by the cigarette lighter of a car for example, and when it is put on standby to receive communications, will consume electrical power and its battery power will be completely used up after a few dozen hours of operation.

SUMMARY OF THE INVENTION

To avoid all those drawbacks, and to facilitate and give more credibility to the use of mobile (cellular) portable telephones, GSM [Global System Mobile], UMTS [Universal Mobile Telephone System] or any other means of communication with a transmitter-receiver which enables a link with the telephone network, for users, the purpose of this invention is to supply a permanent and self-contained direct current voltage using light, vibration and also through the use of a manual spring and electromechanical winder, adaptable to any circumstance whatsoever.

In fact, this invention uses a device which allows the continuous recharging of Nickel hybrid metal batteries, Lithium ion batteries or Cadmium Nickel batteries for powering or operating, among other things, a mobile cellular portable telephone or a communications transmitter-receiver, or a protective telephone case, or a telephone stand, using natural light outside and inside a building (daylight) and/or using the artificial lighting caused by all sorts of light generators such as light bulbs, flashlights, streetlights, neon lights, etc . . . , through a device which consists of photovoltaic sensors whose face is equipped with an energy amplifier (light amplification) and with an electronic management unit capable of analyzing, automatically guiding the connection of the photovoltaic sensors in series or in parallel to have either more electric voltage, or more electric current, and of distinguishing artificial lighting, caused by all sorts of light generators, from daylight (outside light).

If there is no daylight or artificial light (totally dark night), that means the recharging device will be unable to deliver voltage and an electric current. In spite of that handicap, the invention in this recharging device will make it possible to provide voltage and an electric current through vibrations or movements caused by any electrical, physical, mechanical means, such as the swinging movement created by a person walking, a vehicle, train, boat, etc . . . ; through the use of a device comprised of a magnetic counter-weight equipped with a steel ball which is sensitive to movements and vibrations or an extra flat spring mechanical winder attached inside the device. The movement caused by the swinging motion of the steel ball turns around the magnetic counter-weight which, through the electronic management unit, restores continuous electrical energy. In fact, a few minutes of continually moving the telephone, the battery, the case or any means of communication with a transmitter-receiver will recharge the batteries.

It is also possible, without causing vibrations and without moving and without causing vibrations of the device attached to a mobile (cellular) portable telephone, a transmitter-receiver, a case, a stand, and still in a totally dark night, to also produce voltage and an electric current using the mechanical spring winder, and the fact of winding it by turning the butterfly winder tightens the spring. If the butterfly winder is manually released, it frees the spring and turns a small extra flat alternator which will recharge the battery by drawing voltage and an electric current. By this fact, these inventions have the characteristic of being in the same recharging device and allow the mobile (cellular) portable telephone to produce an electric current through light, artificial lighting and vibration and/or the use of a winding mechanism.

If the recharging device is inserted into a protective case, it will be equipped with a rapid connection without a connector due to magnetic induction, which will very easily allow the user to slip the telephone into the protective case and the battery of the case device will recharge and automatically supply the telephone with power through a magnetic induction connector. Thus, the voltage and electric current will pass by magnetization between the case and the mobile (cellular) portable telephone. The case will therefore have the characteristic of recharging itself and powering the mobile portable telephone just as well on the dashboard of a vehicle in the daytime, and the invention also allows it to recharge itself and supply the telephone with power when the vehicle is travelling on a dark night due to the vibrations caused by operating the vehicle.

The recharging device of which another desirable feature is its extra flat shape, can be attached in several ways, either on the battery in a single compact casing for operating among other things the mobile (cellular) portable telephone, which allows the battery to have its own recharging device due to the light and vibrations and to become mobile, portable, self-containing and removable.

The preferably extra flat recharging device can also be attached and connected to the back surface of the mobile (cellular) portable telephone where the battery compartment is located (cover or hatch); and/or on one or all clear surfaces of the mobile (cellular) portable telephone and/or attached to a protective case in order to supply, maintain, recharge and operate the mobile (cellular) portable telephone or any other means of communication with a transmitter-receiver.

But, if the user wants to protect, with a cover or a case, his mobile (cellular) portable telephone or any other means of communication with a transmitter-receiver, by using a case, stand or protective cover, the extra flat recharging device can also be attached and inserted on the case, stand or protective cover and the connection between the telephone and the case, for example, so that it will be powered and able to operate automatically, will be made by an automatic induction connector, as the fact of inserting the telephone into a case, a stand or protective cover, will allow the mobile (cellular) portable telephone to operate immediately.

The above and still further objects, features and advantages of the present invention will become apparent upon consideration of the following detailed description of a specific embodiment thereof, especially when taken in conjunction with the accompanying drawings.

DETAILED DESCRIPTION OF THE DRAWING

Figure 1:
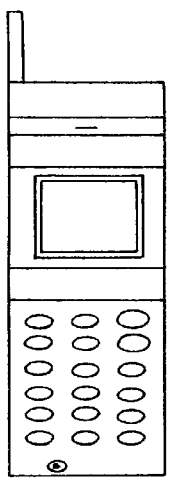
FIG. 1 is a front view of a mobile, cellular telephone in accordance with a preferred embodiment of the present invention.

When the electronic management unit (7) of this recharging device (4) identifies daylight (10)—background outside light—it transforms it into an electric current (13) through photovoltaic sensors (5) which are sensitive to photons, in order to continuously recharge and under the best conditions, the Nickel hybrid metal, or Cadmium Nickel or Lithium ion batteries (2) of the mobile (cellular) portable telephone (1) or the protective case (21).

The electronic management unit (7) of this device (4) can also identify weak light caused by artificial lighting (8) inside a building or from a light coming from a light source such as a flashlight (9) and it will tell the light amplifier (6) to amplify the artificial lighting that it receives, using alveolar lens particles (11), photovoltaic sensors (5) and transform it into an electric current (13) to recharge, with a better performance, the Nickel hybrid metal or Cadmium Nickel or Lithium ion batteries (2) of the mobile (cellular) portable telephone (1) or the protective case (21) so that it then becomes operational.

After the battery (2) recharging is completed, if the artificial and/or synthetic light (8) is very weak (shadow), the recharging device (4) will be able to supply and maintain the battery charge (2), so that the electric current (13) consumption of the portable telephone (1), on standby and waiting, can be totally or partially reduced through parallelling the device's photovoltaic sensors (5) in order to obtain more electric current (13). The parallelling is done automatically by the electronic management unit (7). In fact, each photovoltaic sensor restores voltage and an electric current (13) as soon as light or artificial lighting (8) is detected. The electronic management unit (7) can automatically, depending on the battery (2) demand, increase the voltage by putting the recharging device (4) in series. At that precise moment, there will be little electric current (13); but the electronic management unit (7) will also be able to parallel the photovoltaic sensors (5) and at that precise moment, the electric current (13) will be higher with less voltage.

Thanks to the inventions, this recharging device (4), the mobile (cellular) portable telephone (1), with the protective case (21), is that much more self-contained as it has its own battery (2) recharging device (4) with an automatic light energy control: "low" light or "bright" light that is detected first by the photovoltaic sensors (5), then managed by the electronic management unit (7) that determines whether it must amplify the light to restore it in the form of an electric current (13). The automatic light energy control can be obtained by photovoltaic sensors (5), photodiodes (15), photoresistors (16), etc . . .

The light energy amplification is controlled by the electronic management unit (7), but can also be a mechanical amplification through the alveolar lens particles (11) in/and/or the form of micro-beads embedded and inserted into the photovoltaic sensors (5) to trap daylight or the artificial lighting in order to increase the light radiation, on the mobile (cellular) portable telephone (1) casing, the protective case (21), through the recharging device (4). But the recharging device (4) can also recharge, supply and maintain its own battery (2), the mobile (cellular) portable telephone (1), the protective case (21), and as soon as it detects vibrations (20) caused by the swinging movements of a person walking, a bicycle, a vehicle, a boat, etc . . . through the extra flat magnetic counter-weight (17) whose periphery is equipped with a steel ball (18) which, by turning, creates electrical energy by induction composed of voltage and an electric current (13) managed by the electronic management unit (7). The battery recharge can also be performed by spring mechanisms (22) that are wound manually by hand using a butterfly winder (23), identical to that on a mechanical alarm clock, placed on the recharging device (4). In fact, once the spring mechanism (22) is wound, it will cause, by momentum, either the magnetic counter-weight (17) or an extra flat alternator (25) to automatically generate an electric current (13) aimed at enabling the operation, powering, maintaining or recharging the batteries (2) of the mobile (cellular) portable telephone (1), the protective case (21) or its own battery.

The recharging device (4) can be attached to and inserted on the battery (2), the mobile (cellular) portable telephone (1), on a protective case (21) or on any stand and is capable of powering, maintaining and recharging, without a wire connection, the mobile (cellular) portable telephone (1), and the battery (2) through an induction connector (24). In fact, once the mobile (cellular) portable telephone (1) is inserted into the protective case (21), the power for the telephone (1) will be supplied automatically and by induction (powering by "positive" magnetization and powering by "negative" magnetization) using an induction connector (24) on the protective case (21).

One or more recharging devices (4) can be attached to and inserted on the battery (2) of the mobile (cellular) portable telephone (1), on the mobile (cellular) portable telephone (1), on the protective case (21), on the stand or on any communication system with a transmitter-receiver.

If the electrical current consumption of the mobile (cellular) portable telephone (1) is significant when it is operating, and if the user wishes to use it, this recharging device (4) will recharge, power and enable it to operate in daylight and/or artificial lighting (8) and by vibration (20), and also by the manual spring mechanism (22). On the other hand, if the electrical consumption of the mobile (cellular) portable telephone (1) is not high, the recharging devices (4) will recharge, power and enable it to operate either solely by light or solely by vibration.

The attached plans (plate 1/2 and plate 2/2), provided as indicative and open-ended examples, make it easy to understand the invention.

FIG. 1 of plate 1/2 is a frontal view of the mobile (cellular) portable telephone (1) to which is attached, on all the free parts of the telephone's (1) surface, the recharging device (4) equipment which consists of photovoltaic sensors (5), a light amplifier (6), an electronic management unit (7), alveolar lens particles (11), a magnetic counter-weight (17), steel balls (18), the spring mechanism (22) with its manual butterfly winder (23), the extra flat alternator (25) and battery (2), connected with the aid of the connector (12).

Figure 2:
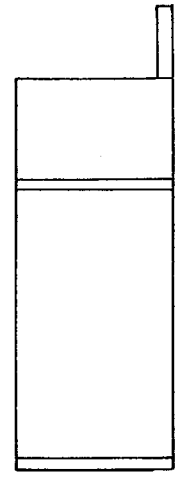
FIG. 2 is a back view of the telephone of FIG. 1.

FIG. 2 of plate 1/2 is a view of the back surface of the mobile (cellular) portable telephone (1) to which is attached, on the upper (free surface) of the telephone (1), the recharging device (4) equipment which consists of photovoltaic sensors (5), a light amplifier (6), an electronic management unit (7), alveolar lens particles (11), a magnetic counter-weight (17), steel balls (18), the spring mechanism (22) with its manual butterfly winder (23), the extra flat alternator (25), connected with the connector (12). On the back surface of the mobile (cellular) portable telephone (1), the recharging device (4) equipment consisting of photovoltaic sensors (5), a light amplifier (6), an electronic management unit (7), alveolar lens particles (11), a magnetic counter-weight (17), steel balls (18), connected with the aid of the connector (12), is attached at the base of the mobile portable telephone (1) on the battery compartment (3).

Figure 3:
FIG. 3 is a side view of the telephone of FIGS. 1 and 2.

FIG. 3 of plate 1/2 is a view of either side of the mobile (cellular) portable telephone (1) to which is attached the recharging device (4) equipment consisting of photovoltaic sensors (5), a light amplifier (6), an electronic management unit (7), alveolar lens particles (11), a magnetic counter-weight (17), steel balls (18), the spring mechanism (22) with its manual butterfly winder (23), an extra flat alternator (25), connected with the aid of the connector (12).

Figure 4:
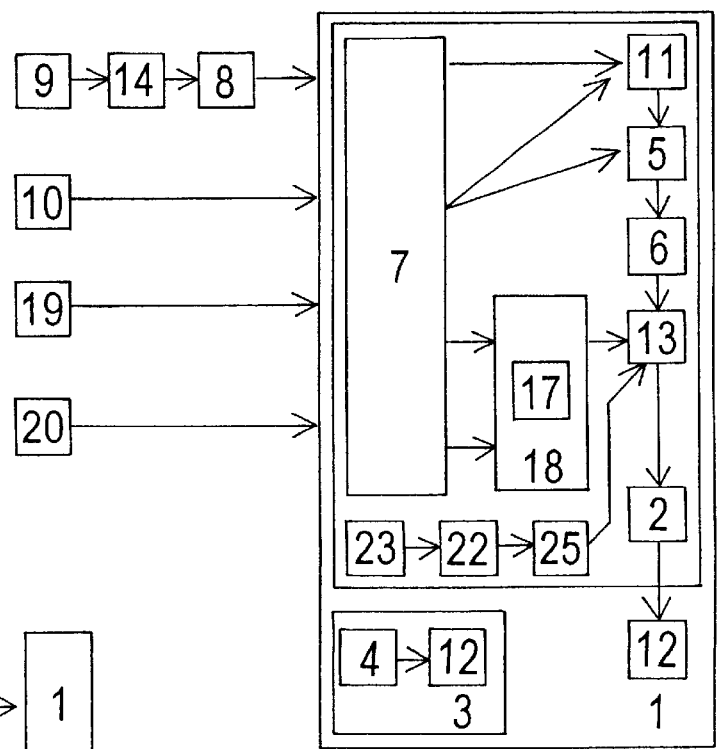
FIG. 4 is a block diagram of components included in the telephone of FIGS. 1–3.

FIG. 4 of plate 1/2 is an overall view of how the recharging device (4) for the mobile (cellular) portable telephone (1) operates. When it receives daylight (10) (outside) or artificial lighting (8) caused by all types of light generators (14), for example a flashlight (9), the recharging device (4) consisting, in a single case, of the electronic management unit (7) using alveolar lens particles (11) embedded and inserted into the photovoltaic sensors (5), will amplify the artificial light received from the flashlight (9) through a light energy amplifier (6) which will transform it into an electric current (13) to recharge, power and maintain the Cadmium Nickel or Nickel hybrid metal or Lithium ion battery (2) of the recharging device (4) connected by a connector (12) to the mobile (cellular) portable telephone (1). But the device (4) can also be connected by the connector (12) to the battery compartment (3) of the mobile (cellular) portable telephone (1), and when it receives vibrations (20) or movements (19), they make the steel ball (18) move around the nucleus of the magnetic counter-weight (17) managed by the electronic management unit (7), and are then transformed into an electric current (13). FIG. 4 also shows an extra flat alternator (25) in the recharging device (4) which will produce an electric current (13) using the spring mechanism (22) activated by the manual butterfly winder (23).

Figure 5:
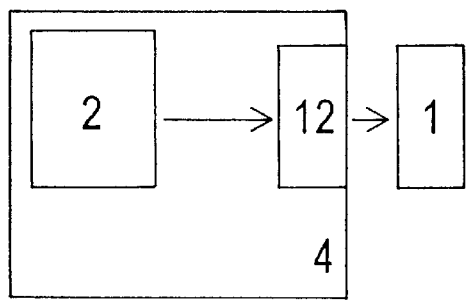
FIG. 5 is a block diagram of a battery recharger in combination with the telephone of FIGS. 1–4.

FIG. 5 in plate 1/2 is an overall view of the recharging device (4) which is connected and integrated with the removable battery (2) equipped with a connector (12) or an inductive connector (24) to power any means of communication using a mobile (cellular) portable telephone. The compact recharging device (4) is composed of photovoltaic sensors (5), alveolar lens particles (11), a light energy amplifier (6), an electronic management unit (7), a magnetic counter-weight (17), steel balls (18), the spring mechanism (22) with its manual butterfly winder (23), the extra flat alternator (25) and the battery (2), which has the characteristic of forming a single recharging device (4) and can transform daylight (10) and/or artificial light (8) and vibration (20) or a movement (19) into an electric current (13) in order to recharge the Nickel hybrid metal, Cadmium Nickel or Lithium ion batteries (2) which are removable, adjustable, interchangeable and capable of being connected (12) to a mobile (cellular) portable telephone (1).

Figure 6:
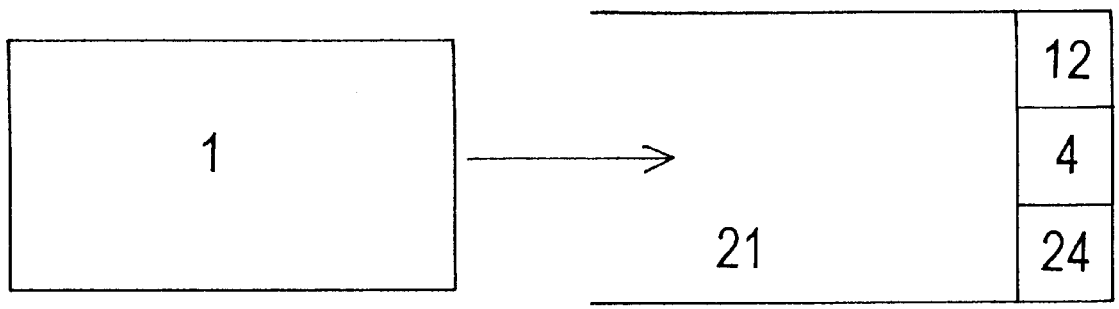
FIG. 6 is a block diagram of the telephone of FIGS. 1–4 in combination with a protective case.

FIG. 6 in plate 2/2 is an overall view representing the mobile (cellular) portable telephone (1) with or without a recharging device (4) and with or without a battery device (2), being inserted into the protective case (21) and becoming operational because of the power from the device (4) in the protective case (21) connected by a connector (12) or by an inductive connector (24).

Figure 7:
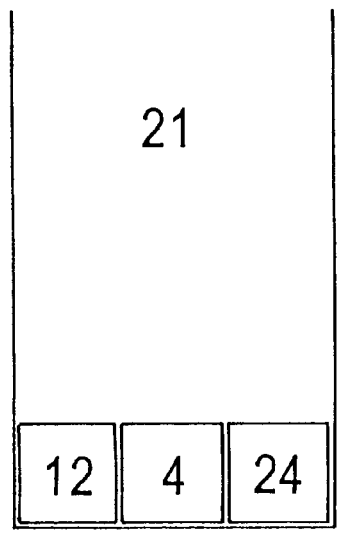
FIG. 7 is a block diagram of the protective case.

FIG. 7 in plate 2/2 is an overall view of a protective case (21) or any other kind of stand or protective cover to which is attached and inserted the recharging device (4), the connector (12) or the inductive connector (24) which is capable of receiving and delivering direct current (13) to any type of mobile (cellular) portable telephone (1) or any communication system with a transmitter-receiver.

TELEPHONE (1)
BATTERY (2)
BATTERY COMPARTMENT (3)
RECHARGING DEVICE (4)
PHOTOVOLTAIC SENSORS (5)
LIGHT ENERGY AMPLIFIER (6)
ELECTRONIC MANAGEMENT UNIT (7)
ARTIFICIAL LIGHTING (8)
FLASHLIGHT (9)
DAYLIGHT (10)
ALVEOLAR LENS PARTICLES (11)
CONNECTOR (12)
ELECTRIC CURRENT (13)
LIGHT GENERATORS (14)
PHOTODIODES (15)
PHOTORESISTORS (16)
MAGNETIC COUNTER-WEIGHT (17)
STEEL BALLS (18)
MOVEMENTS (19)
VIBRATIONS (20)
CASE (21)
SPRING MECHANISM (22)
BUTTERFLY WINDER (23)
INDUCTIVE CONNECTOR (24)
EXTRA FLAT ALTERNATOR (25)

What is claimed is:
1. A portable telephone arrangement comprising a transmitter-receiver, a recharger for accomplishing electric charging, maintaining and powering of a battery pack for the telephone arrangement, said recharger including an optical to electrical transducer and a mechanical motion to electric transducer.

2. The portable telephone arrangement of claim 1 in combination with a case for a portable telephone of the arrangement, the recharger being inserted and attached directly to the case, the telephone fitting into the case and having an exterior shape matching an interior shape of the case so that the recharger can accomplish electric charging, maintaining and powering of the battery pack for the telephone in any position of the telephone and the case.

3. The portable telephone arrangement of claim 1 wherein the mechanical motion to electric transducer includes a winding mechanism.

4. The portable telephone arrangement of claim 1 wherein the mechanical motion to electric transducer includes magnetic counter-weights having a periphery equipped with a steel ball for creating electric energy by induction.

5. The portable telephone arrangement of claim 1 further comprising an electronic management unit for selectively connecting the recharger in series or parallel in response to an indication of the battery pack energy requirements.

6. The portable telephone arrangement of claim 1 wherein the optical to electric transducer includes electronic and mechanical optical amplifiers.

7. The portable telephone arrangement of claim 1 wherein the optical to electric transducer is arranged to be responsive to sunlight and artificial lighting and is located in a protective case for holding the telephone, the case being arranged to enable to telephone to operate and be powered automatically through an inductive connector.

8. The portable telephone arrangement of claim 1 wherein the optical to electric transducer is arranged to be responsive to sunlight and artificial lighting and is located in a protective case for holding the telephone, the case being arranged to enable to telephone to operate and be powered automatically through a magnetic current connector.

9. The portable telephone arrangement of claim 1 wherein the optical to electric transducer is arranged to be responsive to sunlight and artificial lighting and is located in a protective case for holding the telephone, the case being arranged to enable the telephone to operate and be powered automatically through magnetization having the capability of making electric and power connections between the telephone and a protective case in any position.

* * * * *